United States Patent
Mirzoyan et al.

(10) Patent No.: US 12,198,676 B2
(45) Date of Patent: Jan. 14, 2025

(54) ASSIGNING SSML TAGS TO AN AUDIO CORPUS

(71) Applicant: MICROSOFT TECHNOLOGY LICENSING, LLC, Redmond, WA (US)

(72) Inventors: Mikayel Mirzoyan, San Francisco, CA (US); Vidush Vishwanath, Santa Clara, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 269 days.

(21) Appl. No.: 17/710,733

(22) Filed: Mar. 31, 2022

(65) Prior Publication Data

US 2023/0317057 A1  Oct. 5, 2023

(51) Int. Cl.
*G10L 13/10* (2013.01)
*G06F 40/117* (2020.01)
(Continued)

(52) U.S. Cl.
CPC ............ *G10L 13/10* (2013.01); *G06F 40/117* (2020.01); *G06F 40/143* (2020.01);
(Continued)

(58) Field of Classification Search
CPC ......... G10L 13/10; G10L 13/04; G10L 15/22; G10L 15/08; G10L 15/26; G10L 25/18;
(Continued)

(56) References Cited

U.S. PATENT DOCUMENTS 8,146,005 B2 * 3/2012 Jones ................. G06T 13/40
704/258
10,276,149 B1 4/2019 Liang et al.
(Continued)

FOREIGN PATENT DOCUMENTS

CN 108231059 B 6/2021
WO 2019217128 A1 11/2019

OTHER PUBLICATIONS

"International Search Report and Written Opinion issued in PCT Application No. PCT/US22/052194", Mailed Date: Mar. 28, 2023, 12 Pages.
(Continued)

*Primary Examiner* — Huyen X Vo
(74) *Attorney, Agent, or Firm* — Newport IP, LLC; Jacob P. Rohwer

(57) ABSTRACT

This disclosure describes a system that converts an audio object (e.g., an audio book, a podcast, a videoconference meeting) to text with SSML tags so that any future text-to-speech conversion enables speech synthesis to sound more human-like. The system analyzes the audio object to identify speech output characteristics for different tokens. Variations in speech output characteristics can distinguish between an utterance spoken by one character and an utterance spoken by another character. The system assigns the tokens to the characters and compares a speech output characteristic for a token to a baseline speech output characteristic associated with an identified character. Next, the system determines an amount of deviation between the speech output characteristic for the token and the baseline speech output characteristic. The system uses this deviation to determine a relative speech output characteristic value, which is to be included in an SSML tag for a token.

18 Claims, 7 Drawing Sheets

(51) Int. Cl.
*G06F 40/143* (2020.01)
*G06F 40/284* (2020.01)
*G10L 13/04* (2013.01)
*G10L 15/22* (2006.01)
*G10L 15/26* (2006.01)
*G10L 25/18* (2013.01)

(52) U.S. Cl.
CPC ............ *G06F 40/284* (2020.01); *G10L 13/04* (2013.01); *G10L 15/22* (2013.01); *G10L 15/26* (2013.01); *G10L 25/18* (2013.01)

(58) Field of Classification Search
CPC ....... G10L 13/033; G10L 13/08; G10L 17/00; G10L 17/26; G10L 25/48; G06F 40/143; G06F 40/154; G06F 40/117; G06F 40/284
See application file for complete search history.

(56) References Cited

U.S. PATENT DOCUMENTS

| | | |
|---|---|---|
| 2010/0042410 A1 | 2/2010 | Stephens, Jr. |
| 2010/0174533 A1* | 7/2010 | Pakhomov ............ G10L 15/005 704/271 |
| 2011/0295590 A1* | 12/2011 | Lloyd ..................... G10L 15/22 704/8 |
| 2012/0239390 A1 | 9/2012 | Fume |
| 2015/0286627 A1 | 10/2015 | Chang et al. |
| 2020/0279551 A1* | 9/2020 | Sung ...................... G10L 13/08 |
| 2020/0279553 A1 | 9/2020 | Mcduff et al. |
| 2021/0110811 A1 | 4/2021 | Joseph et al. |
| 2022/0351714 A1 | 11/2022 | Yang |
| 2023/0215417 A1 | 7/2023 | Mirzoyan et al. |

OTHER PUBLICATIONS

"International Search Report and Written Opinion Issued in PCT Application No. PCT/US23/012967", Mailed Date: May 3, 2023, 11 Pages.

Non-Final Office Action mailed on Nov. 22, 2023, in U.S. Appl. No. 17/566,554, 37 pages.

Final Office Action mailed on Apr. 18, 2024, in U.S. Appl. No. 17/566,554, 38 pages.

Notice of Allowance mailed on Oct. 17, 2024, in U.S. Appl. No. 17/566,554, 10 pages.

\* cited by examiner

| Token Number | Character ID |
|---|---|
| 1 | 1 |
| 2 | 1 |
| 3 | 1 |
| 4 | 2 |
| 5 | 2 |
| 6 | 2 |
| 7 | 2 |
| 8 | 2 |
| 9 | 1 |
| 10 | 1 |
| 11 | 1 |
| 12 | 1 |

Characteristics for SSML Tags 206

| Pitch (Hz) | Volume (0-100) | Rate (0-1) |
|---|---|---|
| 200 | 50 | 0.4 |
| 200 | 50 | 0.4 |
| 220 | 60 | 0.5 |
| 220 | 60 | 0.5 |
| 220 | 60 | 0.6 |
| 240 | 70 | 0.6 |
| 180 | 70 | 0.3 |
| 240 | 70 | 0.7 |
| 260 | 80 | 0.7 |
| 260 | 80 | 0.7 |
| 260 | 80 | 0.7 |
| 240 | 70 | 0.6 |

FIG. 2

ASSIGNING SSML TAGS TO AN AUDIO CORPUS

BACKGROUND

Speech-to-text (STT) conversion can be used by applications to convert audio to text. For example, a user who wants to communicate with other users during a communication session can provide audio input to a STT application so the utterances spoken by the user can be converted into text. In another example, STT conversion can be used to convert an audio book into text so that it can be read by users. Amongst other reasons, STT conversion can play an important part in accessibility features which are designed and implemented to help people (e.g., people with a hearing impairment).

The conventional computer- and/or network-based services that implement STT conversion produce plain text (i.e., an STT conversion application converts audio directly to plain text). Unfortunately, this conversion to plain text has some drawbacks related to loss of information if and when the plain text is converted back to speech. That is, the plain text fails to capture how utterances are output in the audio, how words are pronounced in the audio, where emphasis is placed in the audio, where pauses occur in the audio, and so forth. This drawback is amplified when an audio corpus has different characters with different speech output characteristics. Consequently, the end-user experience is not optimal because the subsequent text-to-speech (TTS) conversion of text, that was previously converted from speech, is monotone and robotic rather than more human-like and distinct between different characters.

It is with respect to these and other considerations that the disclosure made herein is presented.

SUMMARY

This disclosure describes a system that converts an audio corpus (e.g., a recording, an audio book, a podcast, a videoconference meeting, etc.) to text with Speech Synthesis Markup Language (SSML) tags so that any future text-to-speech (TTS) conversion enables the computer-based speech synthesis to sound more human-like. Consequently, the techniques described herein eliminate, or at least minimize, the loss of information that occurs when speech-to-text (STT) conversion occurs. More specifically, the system automatically (e.g., without human intervention) generates and places SSML tags that encode contextual information for audio that would otherwise be lost in STT conversion.

The system can analyze the audio corpus to identify speech output characteristics for the text. For instance, variations in speech output characteristics can distinguish between an utterance spoken by one character in the audio corpus and an utterance spoken by another character in the audio corpus. As used herein, a character can be a real or a fictitious entity that produces an utterance in the audio corpus (e.g., person, an animal, a tree, an alien, etc.). Thus, a character may have a role in a story or a book, a character may be a narrator of an article, a character may be a participant in a videoconference meeting, etc.

The speech output characteristics can be ones that are defined in SSML tags, such as a volume, a pitch, a rate of speech, a contour, a pause before a word is spoken (e.g., a defined time period such as a half of a second), etc. These speech output characteristics often vary from one character to the next, and as described above, are typically lost when converting speech to text. The system described herein uses automatically generated SSML tags to prevent or minimize this loss. Stated alternatively, the SSML tags gives characters their voices back when converting the text back to speech.

SSML tags can be used by applications, services, and/or features that implement text-to-speech (TTS) conversion to improve the audio experience for end-users. For example, the SSML tags can be associated, via a position or location identifier, with a token in the text. As described herein, the automatic SSML tag generation can be implemented at the token level to enable more accurate, human-like, voice output by a computing device. A token can include a string of characters that captures an utterance. Accordingly, a token can be a single word in any of multiple different languages between two different spaces and/or punctuation marks. A punctuation mark can include a period (.), a comma (,), a colon (:), a semicolon (;), a hyphen (-), a slash (/), etc. A token can alternatively include an N number of words (e.g., N=2 (bigram), N=3, N=4, N=5, etc.). Consequently, the system is configured to "tokenize" the audio corpus, or separate the utterances into different tokens.

The audio corpus may be referred to herein as an audio object. The system is configured to analyze the audio object to identify a speech output characteristic for a token. For example, the system can determine if an utterance is spoken loud within the audio object. In another example, the system can determine if the utterance is spoken fast. In yet another example, the system can determine if the utterance is spoken in a high pitched voice.

Moreover, the system is configured to assign the token to a specific character. The audio object may include parameters that are passed to the system that disclose the number of characters and/or identify the characters in the audio object and/or that reveal the language and/or the dialect spoken by the characters. Moreover, the parameters can include character attributes that generally have an effect on voice characteristics (e.g., age, gender, type of personality, nationality and/or geographic location, etc.). For example, older people are more likely to speak slower than younger people. In another example, females are more likely to speak in a higher pitch when compared to males. In yet another example, human characters with specific nationalities, or that are from specific geographic locations, may be more likely to speak at a faster rate compared to others. In a further example, human characters with an outgoing personality are likely to sound more excited and speak loudly compared to a human character that is more introverted.

If the aforementioned parameters are not provided to the system, the system can analyze the audio object and/or text to recognize some of these parameters and/or character attributes. For example, natural language processing and/or unsupervised clustering such as k-means clustering may be used to obtain the number of characters, identify the characters and/or determine character attributes, and/or assign the appropriate tokens to a character.

Once the characters in the audio object are identified, the system can compare a speech output characteristic for a token from the audio object to a baseline speech output characteristic associated with the identified character. This can be done for different example speech output characteristics to be included in an SSML tag, as described above. The system is configured to generate and/or collect SSML tagged tokens for different characters, and store the SSML tagged tokens and/or specific speech output characteristic token values in a data structure (e.g., dictionary) associated with a specific character or multiple characters. Consequently, the system can calculate the baseline speech output characteristic for a specific character by accessing the SSML tagged tokens and/or specific speech output characteristic token values in the data structure and determining a median token value for the speech output characteristic.

Next, the system uses the comparison to determine an amount of deviation between the speech output characteristic for the token in the text of the audio object and the baseline speech output characteristic associated with the character. The system can use this deviation to determine "relative" token speech output characteristic value, which is to be included in an SSML tag associated with the token. Since this comparison and deviation determination can be implemented for different speech output characteristics to be included in the SSML tag, the system is configured to generate a complete SSML tag that maintains information that enables computer-generated voice to accurately represent a character voice. The system can aggregate the speech output characteristics determined for individual tokens within a data structure as part of the SSML tag generation process.

Alternatively, the analysis of the audio object can produce an "absolute" speech output characteristic for a token, and this absolute speech output characteristic can be used to generate the SSML tag rather than a relative speech output characteristic.

In various implementations, the system described herein can be implemented as a separate standalone service (e.g., a network-based service) that, when called upon by a client (e.g., a news organization, an audio book publisher, a videoconference application, a gaming application, a user application, etc.), can take an audio object as an input, convert the utterances to text (e.g., tokens), and generate SSML tags for the text. For instance, an individual SSML tag can be associated, via a position or location indicator in the text, with a token so speech can be synthesized in an efficient manner. Alternatively, an individual SSML tag can be associated with a token via a wrapping technique where the SSML tag is wrapped around the token (e.g., <SSML1>happy</SSML1><SSML2>day</SSML2>).

Consequently, the disclosed techniques provide a technical solution to a technical problem that stems from the inability for existing STT conversion applications to maintain contextual information (e.g., speech output characteristics for characters) that is useable for a computer to generate more accurate and human-like voices. The disclosed techniques provide a better audio/voice output experience for end-users across a variety of different applications because the speech synthesis is significantly more realistic and human-like. The end-user may want to engage with the STT and/or the TTS conversion for disability purposes and/or for privacy purposes. For instance, when communicating with other game participants, a person playing a game may want to hide their real voice or a particular aspect of their voice that may reveal their age, gender, etc. The techniques provided herein enable the person to realize this degree of privacy, yet improve the speech output so that it sounds more human-like (e.g., variations in volume and/or rate of speech are maintained, but the pitch is disguised).

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 2 is a diagram illustrating example token-level entries added to an example data structure which are useable to automatically generate SSML tags.

DETAILED DESCRIPTION

This disclosure describes a system that converts an audio object (e.g., a recording, an audio book, a podcast, a videoconference meeting, etc.) to text with Speech Synthesis Markup Language (SSML) tags so that any future text-to-speech (TTS) conversion enables the computer-based speech synthesis to sound more human-like. The system can analyze the audio object to identify speech output characteristics for the text. For instance, variations in speech output characteristics can distinguish between an utterance spoken by one character in the audio object and an utterance spoken by another character in the audio object. As used herein, a character can be a real or a fictitious entity that produces an utterance in the audio object (e.g., person, an animal, a tree, an alien, etc.). Thus, a character may have a role in a story or a book, a character may be a narrator of an article, a character may be a participant in a videoconference meeting, etc.

The system assigns tokens to the characters identified in the audio object and compares a speech output characteristic for a token to a baseline speech output characteristic associated with an identified character to which the token is attributed. Next, the system uses the comparison to determine an amount of deviation between the speech output characteristic for the token in the text of the audio object and the baseline speech output characteristic associated with the character. The system can use this deviation to determine a relative token speech output characteristic value, which is to be included in an SSML tag associated with the token. Since this comparison and deviation determination can be implemented for different speech output characteristics to be included in the SSML tag, the system is configured to generate a complete SSML tag that maintains information that enables computer-generated voice to accurately represent an utterance from a character. Various examples, scenarios, and aspects described below with reference to FIGS. 1A-6.

Figure 1A:
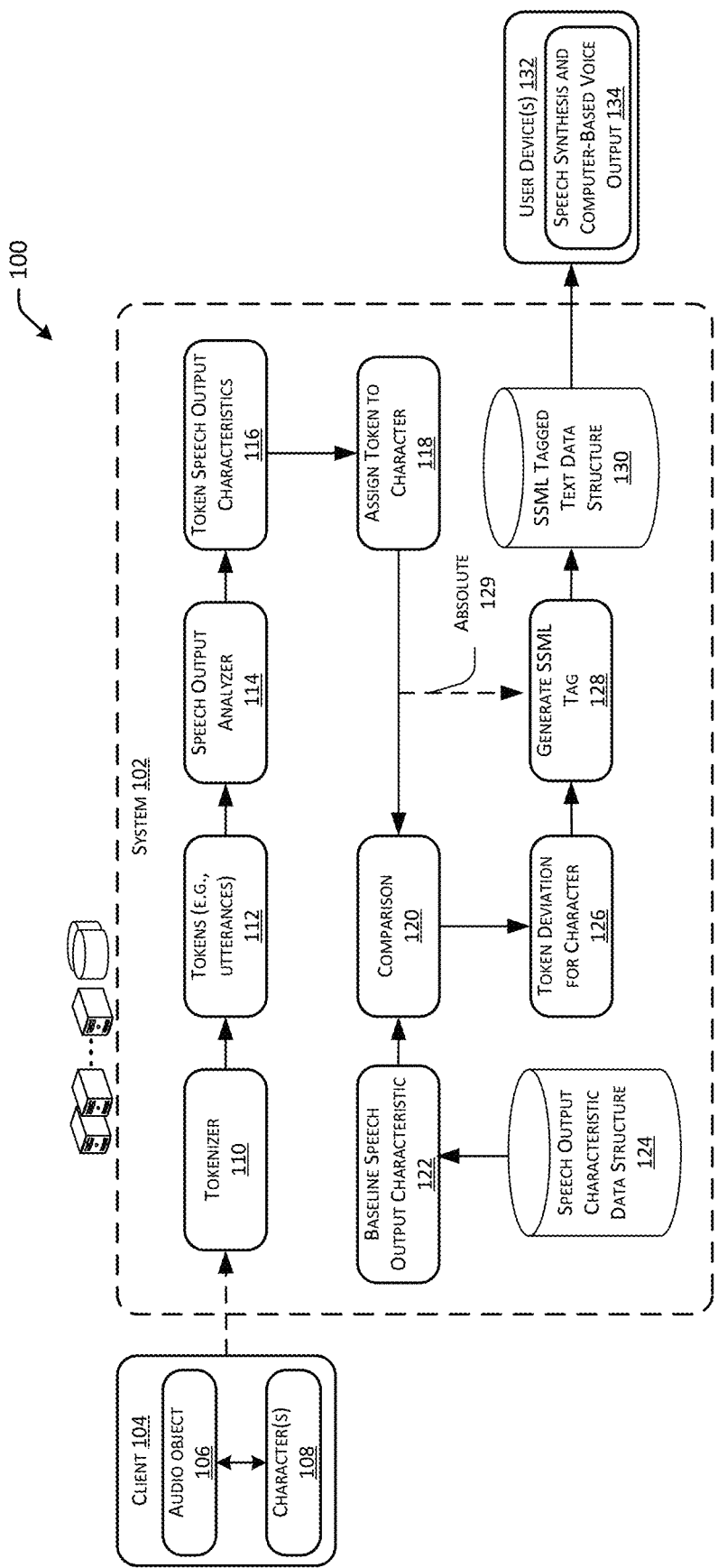
FIG. 1A is a diagram illustrating an example environment in which a system performs contextual analysis on an audio object to extract speech output characteristics for a token and to assign the token to a character so a Speech Synthesis Markup Language (SSML) tag can be generated for the token.

FIG. 1A is a diagram illustrating an example environment 100 in which a system 102 performs contextual analysis on an audio object to extract speech output characteristics for a token and to assign the token to a character. The system 102 can include device(s) (e.g., servers, storage devices, etc.) that are associated with a service that is associated with the conversion from speech to text (STT) and/or conversion from text to speech (TTS). The device(s) and/or other components of the system 102 can include distributed computing resources that communicate with one another, and with remote devices, via one or more network(s). The network(s) can include, for example, public networks such as the Internet, private networks such as an institutional and/or personal intranet, or some combination of private and public networks. Network(s) can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) can utilize communications protocols, including packet-based and/or datagram-based protocols such as internet protocol (IP), transmission control protocol (TCP), user datagram protocol (UDP), or other types of protocols. Moreover, network(s) can also include a number of devices that facilitate network communications and/or form a hardware basis for the networks, such as switches, routers, gateways, access points, firewalls, base stations, repeaters, backbone devices, and the like.

As shown in FIG. 1A, a client 104 (e.g., a news organization, an audio book publisher, a videoconference application, an operating system of a user device, etc.) can provide an audio object 106 to the system 102. As illustrated, the audio object 106 includes utterances spoken by one or multiple character(s) 108. As described above, a character 108 can be a real or a fictitious entity that produces an utterance in the audio corpus (e.g., person, an animal, a tree, an alien, etc.). Thus, a character 108 may have a role in a story or a book, a character may be a narrator of an article, a character may be a participant in a videoconference meeting, a participant in a video game live chat, etc.

The system 102 uses a tokenizer 110 to separate the audio object 106 into different tokens 112. An individual token 112 includes text that represents an utterance. Accordingly, a token 112 can be a single word between two different spaces and/or punctuation marks. A punctuation mark can include a period (.), a comma (,), a colon (:), a semicolon (;), a hyphen (-), a slash (/), etc. A token 112 can alternatively include an N number of words (e.g., N=2 (bigram), N=3, N=4, N=5, etc.).

The system 102 uses a speech output analyzer 114 to extract contextual information from the audio and identify speech output characteristics 116 for individual tokens. For instance, the contextual information can include speech output characteristic values that distinguish an utterance spoken by one character 108 in the audio object 106 from an utterance spoken by another character 108 in the audio object 106.

The speech output characteristics 116 can be ones that are defined in SSML tags, such as a volume, a pitch, a rate of speech, a contour, a pause before a word is spoken (e.g., a defined time period such as a half of a second), etc. These speech output characteristics 116 often vary from one character to the next and/or one token to the next, and as described above, are lost using the conventional approach to converting speech to text. In a more specific example, the speech output analyzer 114 can determine if an utterance is spoken loudly, if the utterance is spoken fast, and/or if the utterance is spoken in a high pitched voice.

The speech output analyzer 114 is also configured to assign the token to a specific character 118. In one example, the audio object 106 may include parameters that are passed to the system 102 by the client 104 and that disclose the number of characters 108 and the identification of the characters 108 in the audio object 106. Moreover, the parameters may reveal the language and/or the dialect spoken by the characters 108. Moreover, the parameters can include character attributes that generally have an effect on speech output characteristics (e.g., age, gender, type of personality, nationality and/or geographic location, etc.). For example, older people are more likely to speak slower than younger people. In another example, females are more likely to speak in a higher pitch when compared to males. In yet another example, human characters with specific nationalities, or that are from specific geographic locations, may be more likely to speak at a faster rate compared to others. In a further example, human characters with an outgoing personality are likely to sound more excited and speak loudly compared to a human character that is more introverted.

If the aforementioned parameters are not provided to the system 102 by the client 104, the system 102 can analyze the audio object 106 and/or the associated text to recognize some of these parameters and/or character attributes. For example, natural language processing and/or unsupervised clustering such as k-means clustering may be used to obtain the number of characters, identify the characters and/or determine character attributes, and/or assign the appropriate tokens to a character.

Once the characters are identified and the tokens 112 are assigned, the system 102 can implement a comparison 120 between a token speech output characteristic 116 extracted from the audio object 106 and a baseline speech output characteristic 122 associated with the identified character. This can be done for different example speech output characteristics included in an SSML tag (e.g., a volume, a pitch, a rate of speech, a contour, a pause before a word is spoken, etc.). The system 102 is configured to generate and/or collect SSML tagged tokens for different characters, and store the SSML tagged tokens and/or speech output characteristic values in a speech output characteristic data structure 124 (e.g., dictionary) associated with a specific character or multiple characters. Consequently, the system 102 can calculate the baseline speech output characteristic 122 for a specific character by accessing the SSML tagged tokens and/or the speech output characteristic values in the data structure 124. The baseline speech output characteristic 122 can be the median value or the average of values for a particular speech output characteristic.

Next, the system uses the comparison 120 to determine an amount of deviation 126 between the token speech output characteristic 116 from the audio object 106 and the baseline speech output characteristic 122 associated with the character. The system 102 can use this deviation to derive a relative speech output characteristic value. The system 102 can then generate an SSML tag 128 for the token using the speech output characteristic value. That is, the system 102 can establish a speech output characteristic value for an SSML tag that is more reflective of the character's voice.

In various examples, a relative speech output characteristic value is used to accommodate environmental factors that have an effect on the analyzed speech output characteristics 116. For example, a microphone used to record may be close to or far from a character which can have an effect on a volume measurement. Thus, the baseline speech output characteristic can be used to "normalize" the speech output characteristic to be included in the SSML tag. Alternatively, the analysis of the audio object can produce an absolute speech output characteristic 129 for a token, which is the analyzed speech output characteristic 115. This absolute speech output characteristic can be used to generate the SSML tag 128 rather than a relative speech output characteristic.

In various implementations, the system 102 described herein can be implemented as a separate standalone service (e.g., a network-based service) that, when called upon by a client 104 (e.g., a news organization, an audio book publisher, a videoconference application, a gaming application, etc.), can take an audio object 106 as an input, convert the utterances to text (e.g., tokens), and generate SSML tags for the text. For instance, an individual SSML tag can be associated, via a position or location indicator in the text, with a token so speech can be synthesized in an efficient manner. Alternatively, an individual SSML tag can be associated with a token via a wrapping technique where the SSML tag is wrapped around the token (e.g., <SSML1>happy</SSML1><SSML2>day</SSML2>).

The system 102 can aggregate the speech output characteristic values determined for individual tokens within a data structure 130 as part of the SSML tag generation process. The data structure 130 provides a mechanism for the contextual information to be extracted at the token level, so that SSML tags can be generated. In some examples, the data structure 130 includes a relational database with one or more tables, indices, stored procedures, and so forth to enable data access.

In one example, the SSML tags 128 can be provided back to the client 104. In this way, the client 104 can improve the audio experience for its end-users by providing the SSML tags 128 to user devices 132. Should a user enable a TTS conversion feature, the client's 104 app can use the SSML tags 128 to improve the speech synthesis and computer-based voice output 134 (e.g., via one or more speakers or headphones). In another example, the SSML tags 128 can be provided directly to user devices 132.

A user device 132 can include, but is not limited to, a game console, a desktop computer, a gaming device, a tablet computer, a personal data assistant (PDA), a mobile phone/tablet hybrid, a laptop computer, a telecommunication device, a computer navigation type client computing device such as a satellite-based navigation system including a global positioning system (GPS) device, a wearable device, a virtual reality (VR) device, an augmented reality (AR) device, an implanted computing device, an automotive computer, a network-enabled television, a thin client, a terminal, an Internet of Things (IoT) device, a work station, a media player, a personal video recorders (PVR), a set-top box, a camera, an integrated component (e.g., a peripheral device) for inclusion in a computing device, an appliance, or any other sort of computing device. In some implementations, a user device 132 includes input/output (I/O) interfaces that enable communications with input/output devices such as user input devices including peripheral input devices (e.g., a game controller, a keyboard, a mouse, a pen, a voice input device, a touch input device, a gestural input device, and the like) and/or output devices including peripheral output devices (e.g., a display, a printer, audio speakers, a haptic output device, and the like).

Figure 1B:
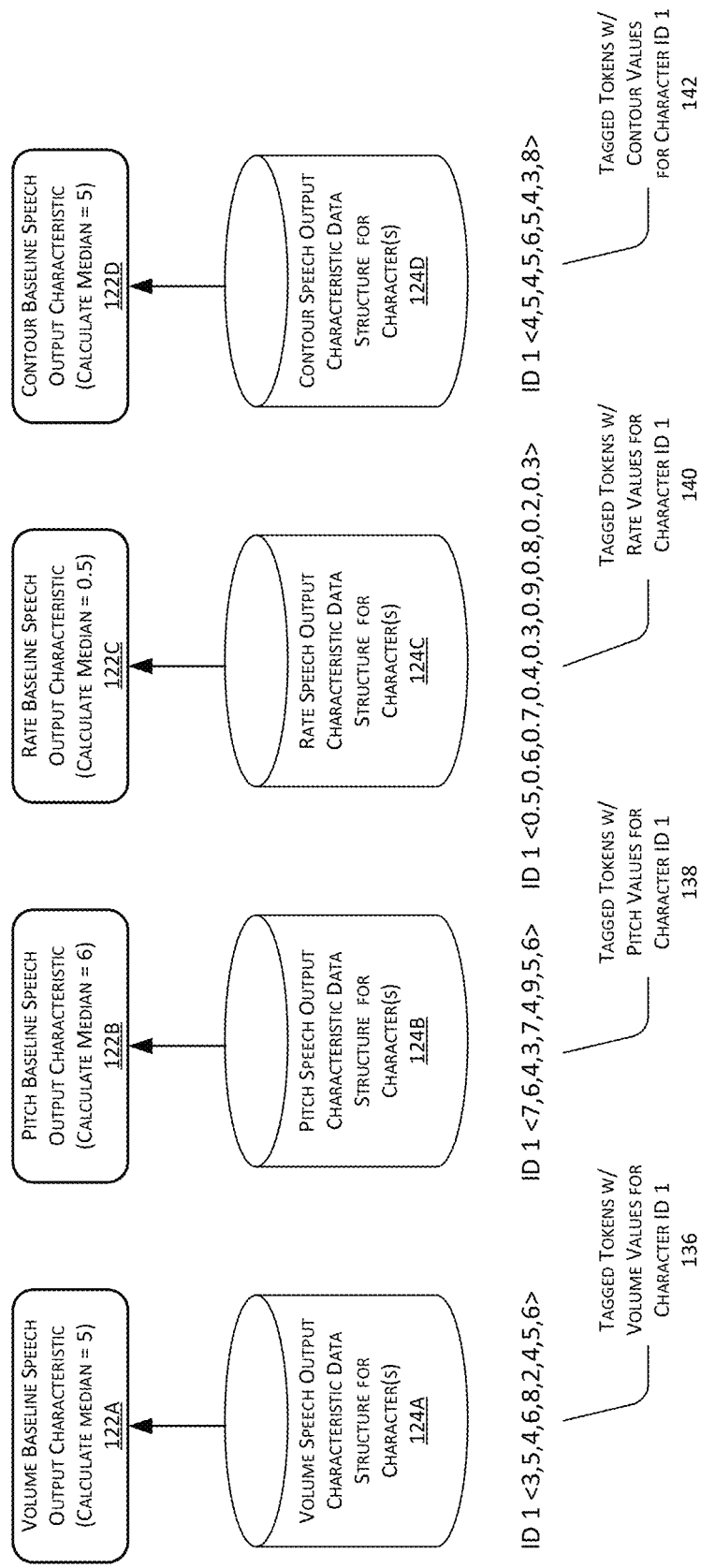
FIG. 1B is a diagram illustrating different speech output characteristics to be included in a SSML tag for a token.

As shown in FIG. 1B, the comparison 120 and deviation determination can be implemented for different speech output characteristics to be included in the SSML tag. Note the number of values stored in association with a character in a data structure of FIG. 1B and/or the actual values in FIG. 1B are used for ease of discussion. Accordingly, the actual number of values stored in association with a character in a data structure is likely in the thousands and perhaps millions, and moreover the actual values may be more reflective of the speech output characteristics (e.g., pitch can be measured by more realistic Hz values).

A volume speech output characteristic data structure for one or more character(s) 124A is used to calculate a volume baseline speech output characteristic 122A for each character. The volume speech output characteristic data structure for one or more character(s) 124A includes volume values for SSML tagged tokens that have been previously attributed or assigned to a specific character 136. For example, SSML tagged tokens include volume values inserted into the data structure for one or more character(s) 124A as <3,5,4,6,8,2,4,5,6> and these volume values are assigned to character identification "1". Similar datasets with different volume values can be stored for character identifications "2", "3" ... N. In one example, the volume baseline speech output characteristic 122A is calculated for character ID "1" to be the median of these values (e.g., median=5).

Similarly, a pitch characteristic data structure for one or more character(s) 124B is used to calculate a pitch baseline speech output characteristic 122B for each character. The pitch speech output characteristic data structure for one or more character(s) 124B includes pitch values for SSML tagged tokens that have been previously attributed or assigned to a specific character 138. For example, SSML tagged tokens include pitch values (e.g., in Hz) inserted into the data structure for one or more character(s) 124B as <7,6,4,3,7,4,9,5,6> and these pitch values are assigned to character identification "1". Similar datasets with different pitch values can be stored for character identifications "2", "3" ... N. In one example, the pitch baseline speech output characteristic 122B is calculated to be the median of these values (e.g., median=6).

Further, a rate characteristic data structure for one or more character(s) 124C is used to calculate a rate baseline speech output characteristic 122C for each character. The rate speech output characteristic data structure for one or more character(s) 124C includes rate values for SSML tagged tokens that have been previously attributed or assigned to a specific character 140. For example, SSML tagged tokens include rate values (e.g., normalized to a value between 0 and 1) inserted into the data structure for one or more character(s) 124C as <0.5,0.6,0.7,0.4,0.3,0.9,0.8,0.2,0.3> and these rate values are assigned to character identification "1". Similar datasets with different rate values can be stored for character identifications "2", "3" ... N. In one example, the rate baseline speech output characteristic 122C is calculated to be the median of these values (e.g., median=0.5).

Finally, a contour characteristic data structure for one or more character(s) 124D is used to calculate a contour baseline speech output characteristic 122D for each character. The contour speech output characteristic data structure for one or more character(s) 124D includes rate values for SSML tagged tokens that have been previously attributed or assigned to a specific character 142. For example, SSML tagged tokens include contour values inserted into the data structure for one or more character(s) 124D as <4,5,4,5,6,5,4,3,8> and these contour values are assigned to character identification "1". Similar datasets with different contour values can be stored for character identifications "2", "3" ... N. In one example, the rate baseline speech output characteristic 122D is calculated to be the median of these values (e.g., median=5).

While the example baseline calculation above identified the median, other calculations can be used to determine the baseline speech output characteristic value as well (e.g., an average of the values in the data structures 124A-124D). Consequently, via the comparison 120, the system 102 is configured to generate a complete SSML tag with values for various speech output characteristics that more accurately reflect a character's voice. This prevents or minimizes the loss of contextual information and enables computer-generated voice to more accurately represent a character's voice.

In various examples, the system 102 can shift a character's baseline to conceal the character's true voice. Going back to the previously provided example of a character wanting to conceal their true voice, one baseline (e.g., the pitch baseline) can be shifted up or down to hide the character's true voice while the other baselines (e.g., volume, rate, contour) can be maintained to capture the more human-like variations in utterances. Furthermore, the client 104 may be configured to provide input that sets rules or boundaries with regard to a maximum or a minimum speech characteristic value that can be included in an SSML tag. For instance, such a rule or boundary can ensure that rate of speech is not too fast or that the volume is not too loud.

FIG. 2 is a diagram illustrating example token-level entries into an example data structure 130 which are useable to automatically generate SSML tags. As shown, the data structure 130 includes a column 202 for the token number (e.g., 1, 2, 3, 4, 5, 6, etc.) for the audio object 106 and a column 204 for a character identification (e.g., 1, 2, etc.) to which each token has been assigned. The speech output characteristics for the SSML tags 206, which are determined based on a comparison between a measured speech output characteristic value 116 and a baseline speech output characteristic value 122 can include a pitch value reflected in a pitch column 206, a volume value reflected in a volume column 208, and/or a rate of speech value reflected in rate column 210. Other voice characteristics which can be included and defined in SSML tags are also contemplated (e.g., a contour, a duration of time before an utterance, etc.).

Figure 3:
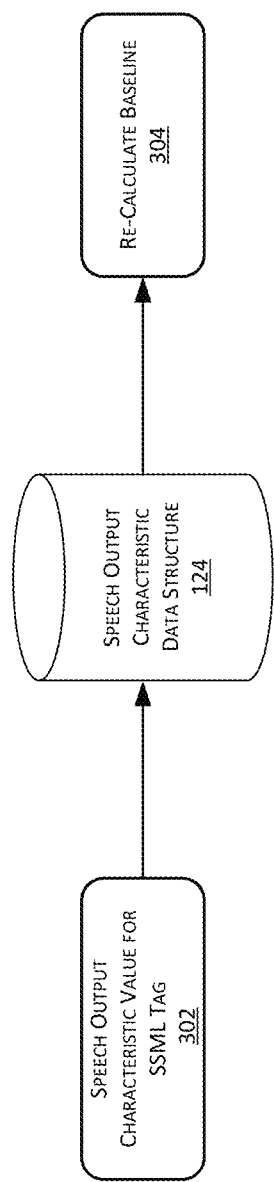
FIG. 3 is a diagram illustrating how newly determined token speech output characteristics can be added to a speech output characteristic data structure to re-calculate the baseline speech output characteristic for a specific character.

FIG. 3 is a diagram illustrating how newly determined token speech output characteristic values for an SSML tag 302 can be added to a speech output characteristic data structure 124 to re-calculate the baseline speech output characteristic 304 for a specific character. As more and more audio objects are analyzed and converted to text with SSML tags, the system 102 can implement a machine-learning model that continually updates the baseline speech output characteristic values for a particular character. This is illustrated in FIG. 3.

Figure 4:
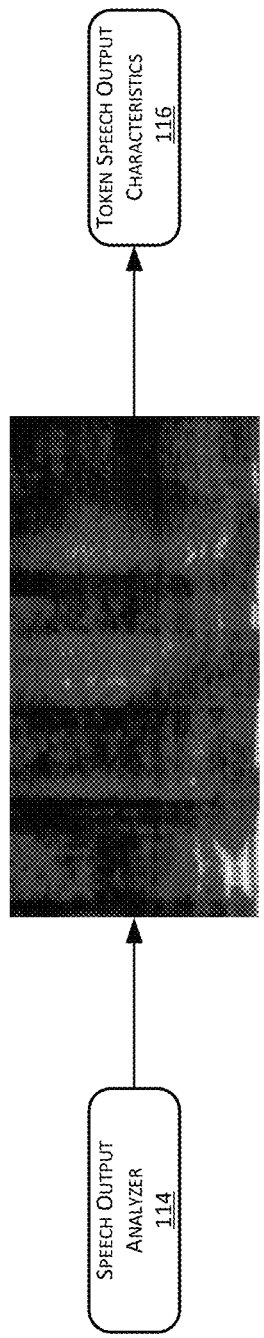
FIG. 4 is a diagram illustrating an example of how the speech output analyzer can be applied to an image to determine speech output characteristics for a token.

FIG. 4 is a diagram illustrating an example of how the speech output analyzer 114 can be applied to an image 402 to determine speech output characteristics 116 for a token. In this example, the audio object 106, and more specifically, one or more utterances in the audio object are represented by a spectrogram image 402. The speech output analyzer 114 is trained to analyze the features in the spectrogram image 402 to output the speech output characteristics 116 at the token-level.

Figure 5:
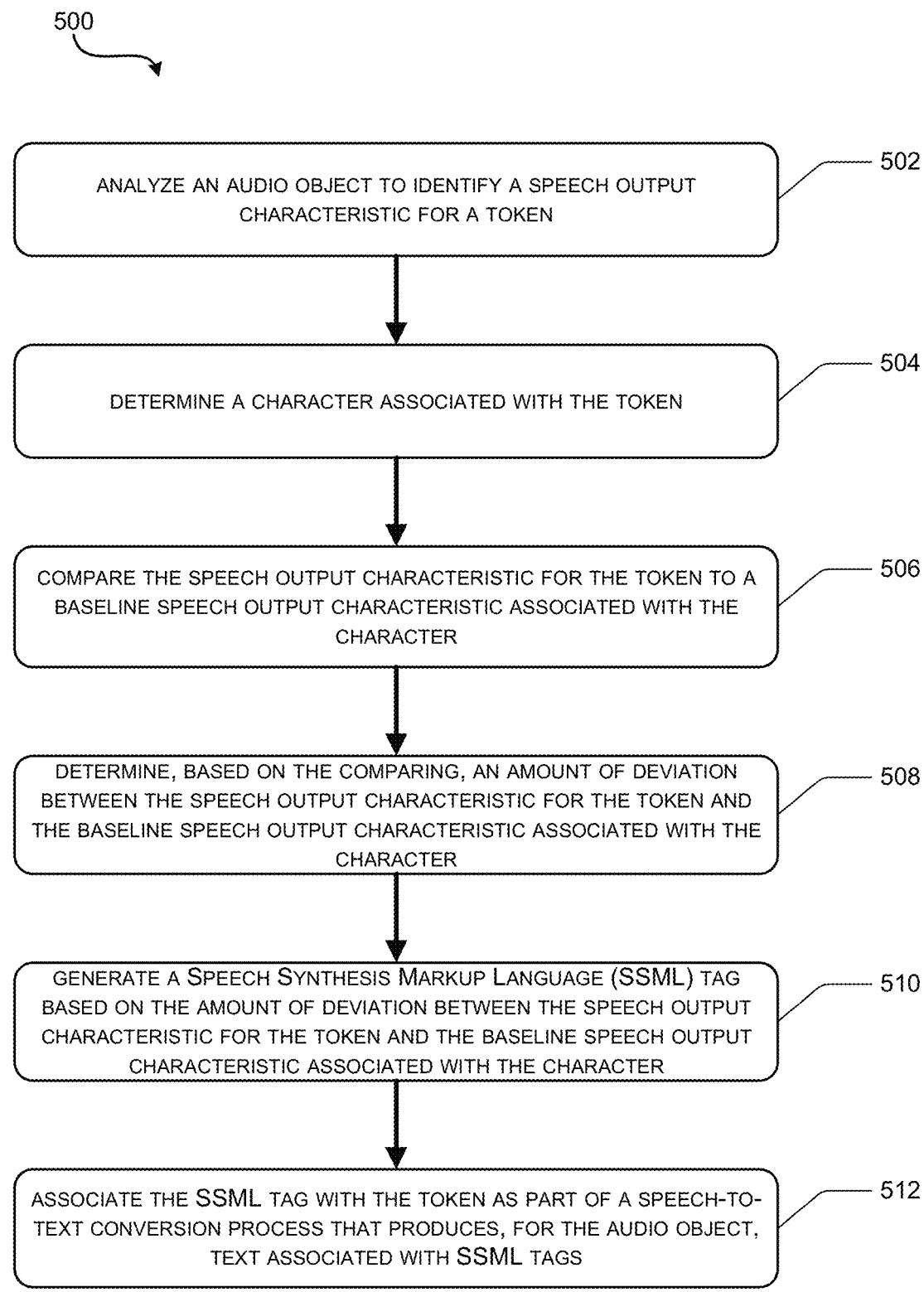
FIG. 5 is a flow diagram of an example method for extracting speech output characteristics for a token and assigning the token to a character so a SSML tag can be generated for the token.

FIG. 5 represents an example process in accordance with various examples from the description of FIGS. 1A-4. The example operations shown in FIG. 5 can be implemented on or otherwise embodied in one or more of the various devices described herein. Moreover, modules and/or components can carry out operation(s) of described example processes.

The order in which the operations are described in each example flow diagram is not intended to be construed as a limitation, and any number of the described operations can be combined in any order and/or in parallel to implement each process. Moreover, the operations in FIG. 5 can be implemented in hardware, software, and/or a combination thereof. In the context of software, the operations represent computer-executable instructions that, when executed by one or more processors, cause one or more processors to perform the recited operations. For example, modules and other components described herein can be stored in a computer-readable media and executed by at least one processor to perform the described operations. In the context of hardware, the operations can represent logic functions implemented in circuitry (e.g., datapath-control and finite-state-machine sequencing functions).

FIG. 5 is a flow diagram 500 of an example method for extracting speech output characteristics for a token and assigning the token to a character so a Speech Synthesis Markup Language (SSML) tag can be generated for the token.

At operation 502, an audio object is analyzed to identify a speech output characteristic for a token. At operation 504, a character associated with the token is determined or identified. At operation 506, the speech output characteristic for the token is compared to a baseline speech output characteristic associated with the character.

Next, at operation 508, an amount of deviation between the speech output characteristic for the token and the baseline speech output characteristic associated with the character is determined. At operation 512, a Speech Synthesis Markup Language (SSML) tag is generated based on the amount of deviation between the speech output characteristic for the token and the baseline speech output characteristic associated with the character. At operation 514, the SSML tag is associated with the token as part of a speech-to-text conversion process that produces, for the audio object, text associated with SSML tags.

Figure 6:
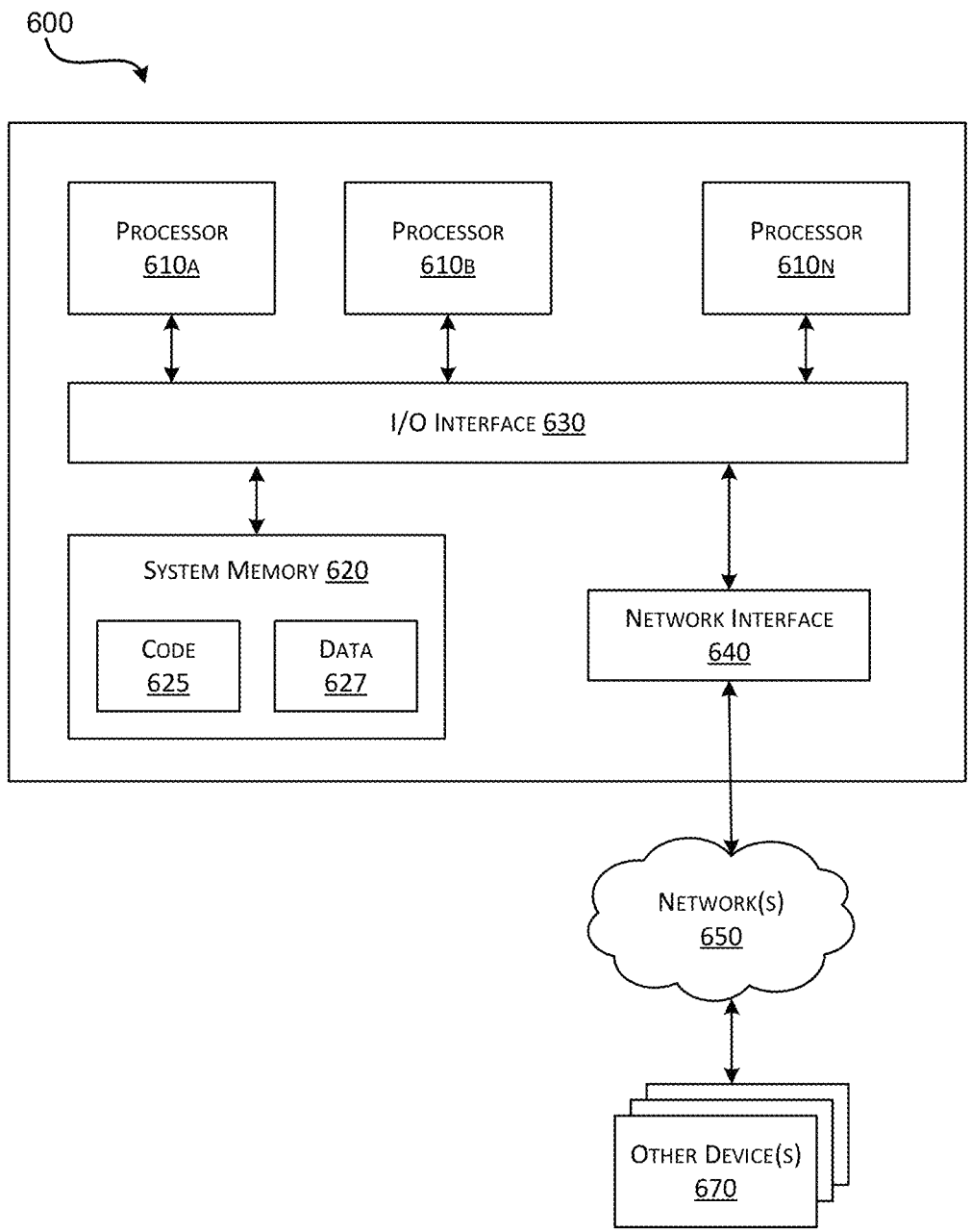
FIG. 6 is an example computing system capable of implementing the techniques of the present disclosure.

FIG. 6 illustrates a general-purpose computing device 600. In various examples, device 600 can be a server computer or any other sort of computing device that can serve as a physical host or other sort of computing device in a network system. In the illustrated embodiment, computing device 600 includes one or more processors 610a, 610b, and/or 610n (which may be referred herein singularly as "a processor 610" or in the plural as "the processors 610") coupled to a system memory 620 via an input/output (I/O) interface 630. Computing device 600 further includes a network interface 640 coupled to the I/O interface 630. In various embodiments, the processors 610 can be the processing cores described above.

In various embodiments, computing device 600 may be a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the x77, PowerPC, SPARC, or MIPS ISAs, or any other suitable ISA. In multiprocessor systems, each of processors 610 may commonly, but not necessarily, implement the same ISA.

System memory 620 may be configured to store instructions and data accessible by processor(s) 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those routines, techniques and data described above, are shown stored within system memory 620 as code 625 and data 627.

In one embodiment, the I/O interface 630 may be configured to coordinate I/O traffic between the processor 610, system memory 620, and any peripheral devices in the device, including network interface 640 or other peripheral interfaces. In some embodiments, the I/O interface 630 may perform any necessary protocol, timing, or other data transformations to convert data signals from one component (e.g., system memory 620) into a format suitable for use by another component (e.g., processor 610). In some embodiments, the I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components. Also, in some embodiments some or all of the functionality of the I/O interface 630, such as an interface to system memory 620, may be incorporated directly into processor 610.

Network interface 640 may be configured to allow data to be exchanged between computing device 600 and other device or devices 670 attached to a network or network(s) 650, such as other computer systems or components illustrated in FIGS. 1A-4, for example. In various embodiments, network interface 640 may support communication via any suitable wired or wireless general data networks. Additionally, network interface 640 may support communication via telecommunications/telephony networks such as analog voice networks or digital fiber communications networks, via storage area networks such as Fibre Channel SANs or via any other suitable type of network and/or protocol.

Network(s) 650 may include, for example, public networks such as the Internet, private networks such as an institutional and/or personal intranet, or some combination of private and public networks. Network(s) 650 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, 5G and so forth) or any combination thereof. Network(s) 650 may utilize communications protocols, including packet-based and/or datagram-based protocols such as Internet protocol ("IP"), transmission control protocol ("TCP"), user datagram protocol ("UDP"), or other types of protocols. Moreover, network(s) 650 may also include a number of devices that facilitate network communications and/or form a hardware basis for the networks, such as switches, routers, gateways, access points, firewalls, base stations, repeaters, backbone devices, and the like.

In some embodiments, system memory 620 may be one embodiment of a computer-accessible medium configured to store program instructions and data as described above for FIGS. 1A-5. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 600 via I/O interface 630. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 600 as system memory 620 or another type of memory. Further, a computer-accessible medium may include transmission media or signals such as electrical, electromagnetic or digital signals, conveyed via a communication medium such as a network and/or a wireless link, such as may be implemented via network interface 640.

Portions or all of multiple computing devices, such as those illustrated in FIG. 6, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "system" and/or "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information, and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 6, may include other components that are not explicitly shown in FIG. 6, or may utilize an architecture completely different than that shown in FIG. 6.

The disclosure presented herein also encompasses the subject matter set forth in the following clauses.

Example Clause A, a method comprising: analyzing an audio object to identify a speech output characteristic for a token; determining a character associated with the token; comparing the speech output characteristic for the token to a baseline speech output characteristic associated with the character; determining, based on the comparing, an amount of deviation between the speech output characteristic for the token and the baseline speech output characteristic associated with the character; generating a Speech Synthesis Markup Language (SSML) tag based on the amount of deviation between the speech output characteristic for the token and the baseline speech output characteristic associated with the character; and associating the SSML tag with the token as part of a speech-to-text conversion process that produces, for the audio object, text associated with SSML tags.

Example Clause B, the method of Example Clause A, wherein the speech output characteristic comprises a volume, a pitch, a rate of speech, or a contour.

Example Clause C, the method of Example Clause A or Example Clause B, further comprising tokenizing the audio object to generate a plurality of tokens that represent a plurality of utterances.

Example Clause D, the method of any one of Example Clauses A through C, further comprising calculating the baseline speech output characteristic associated with the character based on speech output characteristic values stored in a data structure for the character.

Example Clause E, the method of Example Clause D, wherein the baseline speech output characteristic is calculated to be the median of the speech output characteristic values stored in the data structure for the character.

Example Clause F, the method of any one of Example Clauses A through E, wherein the amount of deviation between the speech output characteristic for the token and the baseline speech output characteristic associated with the character is used to produce a relative speech output characteristic value that represents a voice of an utterance.

Example Clause G, a system comprising: one or more processors; and computer storage media storing instructions that, when executed by the one or more processors, cause the system to perform operations comprising: analyzing an audio object to identify a speech output characteristic for a token; determining a character associated with the token; comparing the speech output characteristic for the token to a baseline speech output characteristic associated with the character; determining, based on the comparing, an amount of deviation between the speech output characteristic for the token and the baseline speech output characteristic associated with the character; and generating a Speech Synthesis Markup Language (SSML) tag based on the amount of deviation between the speech output characteristic for the token and the baseline speech output characteristic associated with the character.

Example Clause H, the system of Example Clause G, wherein the operations further comprise associating the SSML tag with the token as part of a speech-to-text conversion process that produces, for the audio object, text associated with SSML tags.

Example Clause I, the system of Example Clause G or Example Clause H, wherein the speech output characteristic comprises a volume, a pitch, a rate of speech, or a contour.

Example Clause J, the system of any one of Example Clauses G through I, wherein the operations further comprise tokenizing the audio object to generate a plurality of tokens that represent a plurality of utterances.

Example Clause K, the system of any one of Example Clauses G through J, wherein the operations further comprise calculating the baseline speech output characteristic associated with the character based on speech output characteristic values stored in a data structure for the character.

Example Clause L, the system of Example Clause K, wherein the baseline voice characteristic is calculated to be the median of the speech output characteristic values stored in the data structure for the character.

Example Clause M, the system of any one of Example Clauses G through L, wherein the amount of deviation between the speech output characteristic for the token and the baseline speech output characteristic associated with the character is used to produce a relative speech output characteristic value that represents a voice of an utterance.

Example Clause N, the system of any one of Example Clauses G through M, wherein the audio object comprises at least one spectrogram.

Example Clause O, one or more computer storage media storing instructions that, when executed by one or more processors, cause a system to perform operations comprising: analyzing an audio object to identify a speech output characteristic for a token; determining a character associated with the token; comparing the speech output characteristic for the token to a baseline speech output characteristic associated with the character; determining, based on the comparing, an amount of deviation between the speech output characteristic for the token and the baseline speech output characteristic associated with the character; and generating a Speech Synthesis Markup Language (SSML) tag based on the amount of deviation between the speech output characteristic for the token and the baseline speech output characteristic associated with the character.

Example Clause P, the one or more computer storage media of Example Clause O, wherein the operations further comprise associating the SSML tag with the token as part of a speech-to-text conversion process that produces, for the audio object, text associated with SSML tags.

Example Clause Q, the one or more computer storage media of Example Clause O or Example Clause P, wherein the speech output characteristic comprises a volume, a pitch, a rate of speech, or a contour.

Example Clause R, the one or more computer storage media of any one of Example Clauses O through Q, wherein the operations further comprise calculating the baseline speech output characteristic associated with the character based on speech output characteristic values stored in a data structure for the character.

Example Clause S, the one or more computer storage media of Example Clause R, wherein the baseline speech output characteristic is calculated to be the median of the speech output characteristic values stored in the data structure for the character.

Example Clause T, the one or more computer storage media of any one of Example Clauses O through S, wherein the amount of deviation between the speech output characteristic for the token and the baseline speech output characteristic associated with the character is used to produce a relative speech output characteristic value that represents a voice of an utterance.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different tokens, two different speech output characteristics, etc.).

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method comprising:
    analyzing an audio object to identify a speech output characteristic for a token;
    determining a character that speaks the token in the audio object;
    comparing the speech output characteristic for the token to a baseline speech output characteristic specific to the character;
    determining, based on the comparing, an amount of deviation between the speech output characteristic for the token and the baseline speech output characteristic associated with the character;
    generating a Speech Synthesis Markup Language (SSML) tag based on the amount of deviation between the speech output characteristic for the token and the baseline speech output characteristic associated with the character;
    associating the SSML tag with the token as part of a speech-to-text conversion process that produces, for the audio object, text associated with SSML tags; and
    providing the text associated with the SSML tags to a device or application configured to generate a computer-based voice output based on the text and the SSML tags.

2. The method of claim 1, wherein the speech output characteristic comprises a volume, a pitch, a rate of speech, or a contour.

3. The method of claim 1, further comprising tokenizing the audio object to generate a plurality of tokens that represent a plurality of utterances.

4. The method of claim 1, further comprising calculating the baseline speech output characteristic specific to the character based on speech output characteristic values stored in a data structure for the character.

5. The method of claim 4, wherein the baseline speech output characteristic is calculated to be the median of the speech output characteristic values stored in the data structure for the character.

6. The method of claim 1, wherein the amount of deviation between the speech output characteristic for the token and the baseline speech output characteristic specific to the character is used to produce a relative speech output characteristic value that represents a voice of an utterance.

7. A system comprising:
    one or more processors; and
    computer storage media storing instructions that, when executed by the one or more processors, cause the system to perform operations comprising:
        analyzing an audio object to identify a speech output characteristic for a token;
        determining a character that speaks the token in the audio object;
        comparing the speech output characteristic for the token to a baseline speech output characteristic specific to the character;
        determining, based on the comparing, an amount of deviation between the speech output characteristic for the token and the baseline speech output characteristic associated with the character;
        generating a Speech Synthesis Markup Language (SSML) tag based on the amount of deviation between the speech output characteristic for the token and the baseline speech output characteristic associated with the character;
        associating the SSML tag with the token as part of a speech-to-text conversion process that produces, for the audio object, text associated with SSML tags; and
        providing the text associated with the SSML tags to a device or application configured to generate a computer-based voice output based on the text and the SSML tags.

8. The system of claim 7, wherein the speech output characteristic comprises a volume, a pitch, a rate of speech, or a contour.

9. The system of claim 7, wherein the operations further comprise tokenizing the audio object to generate a plurality of tokens that represent a plurality of utterances.

10. The system of claim 7, wherein the operations further comprise calculating the baseline speech output characteristic specific to the character based on speech output characteristic values stored in a data structure for the character.

11. The system of claim 10, wherein the baseline voice characteristic is calculated to be the median of the speech output characteristic values stored in the data structure for the character.

12. The system of claim 7, wherein the amount of deviation between the speech output characteristic for the token and the baseline speech output characteristic specific to the character is used to produce a relative speech output characteristic value that represents a voice of an utterance.

13. The system of claim 7, wherein the audio object comprises at least one spectrogram.

14. One or more computer storage media storing instructions that, when executed by one or more processors, cause a system to perform operations comprising:
- analyzing an audio object to identify a speech output characteristic for a token;
- determining a character that speaks the token in the audio object;
- comparing the speech output characteristic for the token to a baseline speech output characteristic specific to the character;
- determining, based on the comparing, an amount of deviation between the speech output characteristic for the token and the baseline speech output characteristic associated with the character;
- generating a Speech Synthesis Markup Language (SSML) tag based on the amount of deviation between the speech output characteristic for the token and the baseline speech output characteristic associated with the character;
- associating the SSML tag with the token as part of a speech-to-text conversion process that produces, for the audio object, text associated with SSML tags; and
- providing the text associated with the SSML tags to a device or application configured to generate a computer-based voice output based on the text and the SSML tags.

15. The one or more computer storage media of claim 14, wherein the speech output characteristic comprises a volume, a pitch, a rate of speech, or a contour.

16. The one or more computer storage media of claim 14, wherein the operations further comprise calculating the baseline speech output characteristic specific to the character based on speech output characteristic values stored in a data structure for the character.

17. The one or more computer storage media of claim 16, wherein the baseline speech output characteristic is calculated to be the median of the speech output characteristic values stored in the data structure for the character.

18. The one or more computer storage media of claim 14, wherein the amount of deviation between the speech output characteristic for the token and the baseline speech output characteristic specific to the character is used to produce a relative speech output characteristic value that represents a voice of an utterance.

* * * * *